United States Patent Office 3,104,704
Patented Sept. 24, 1963

---

3,104,704
FLUID LOSS CONTROL IN HYDRAULIC CEMENT SLURRIES
Clare H. Kucera and Archie N. Barron, Tulsa, Okla., assignors to The Dow Chemical Company, Midland, Mich., a corporation of Delaware
No Drawing. Filed Aug. 17, 1959, Ser. No. 833,930
2 Claims. (Cl. 166—31)

The invention relates generally to cementing wells penetrating subterranean formations. More particularly it relates to a pumpable aqueous cement slurry, useful in cementing wells, which sets or hardens in situ accompanied by a low water loss to the formation.

In drilling holes of appreciable depth into the earth, such as wellbores through fluid-producing formations, precautions usually must be taken to prevent crumbling, sloughing, or caving in of the walls of the hole. The precaution usually employed is a well casing which offers the additional advantages of retaining within it a column of the fluid being produced and of preventing the inflow of undesirable fluids from superjacent and subjacent formations.

To accomplish the purposes for which a well casing is used, a seal must usually be provided between the outer surface of the casing and the wall of the wellbore and an anchoring means must be provided to secure the casing in place and enable it to resist being vertically shifted out of place such as may easily occur in wellbores which are subjected to appreciable pressure.

Both a seal between the casing and wellbore and an anchor to prevent shifting of the casing in the wellbore are provided generally by the employment of a pumpable cement slurry which sets into a monolithic mass in situ. The slurry is pumped into the annulus between the casing and the walls of the wellbore or into an uncased extension of the wellbore below the casing usually by pumping it down a string of tubing or down the casing to the bottom thereof or out through perforations therein. The cement slurry may then be forced back up and/or further down the annular space between the casing and wellbore wall. The slurry in the annular space between the casing and the wellbore wall, after setting, prevents migration or seepage of fluid vertically from one horizontal stratum to another through such annular space that would otherwise exist about the exterior of the casing. The slurry at the foot of the casing, after setting, prevents seepage around the lower end of the casing particularly from subjacent strata. The set-up cement, both along the vertical exterior of the casing and in the recess at the foot thereof, mutually cooperate to secure the casing in place.

Cement slurries, presently largely used for cementing wells, are admixtures of water and either Portland cement or high alumina cement (also known as aluminous cement); these cements in accordance with general terminology are referred to herein as hydraulic cements. Portland cement is prepared by sintering limestone and clay to form a clinker and cooling and pulverizing the resulting clinker. High alumina cements are prepared by admixing during preparation thereof suitable amounts of fused bauxite and limestone.

A number of difficulties accompany the employment of hydraulic cements in cementing wells. Among such difficulties is the loss of water therefrom before the cement has set, particularly while forcing the cement slurry into the annular space between the wellbore wall and the casing. Injecting hydraulic cement slurries into such annular space requires relatively high pressure. The pressure at times results in squeezing water from the slurry and forcing such water out into the pores of the formation, leaving a partially dehydrated slurry that is sometimes impossible to force on into the desired space, thereby resulting in premature setting-up and wrong placement of the thus-thickened slurry.

It is known to add fluid loss agents to hydraulic cement slurries. Among such agents are such organic materials as dextrin, wheat flour, starches, carboxymethylcellulose, alkyl hydroxyalkyl cellulose mixed ethers, chitin, and inulin and such inorganic materials as slate flour and pulverulent aluminous materials, e.g., bauxite, or clay.

Hydraulic cement slurries to which known fluid loss agents have been added have met with some success. However, most of the known agents, which when admixed with a cement slurry have lessened the loss of water from the slurry during setting, have also adversely affected the rate of setting of the slurry or in some other way have caused adverse effects, e.g., reduced pumpability.

A need exists for an aqueous hydraulic cement composition which has improved fluid-loss properties while setting, is readily pumpable, and has a satisfactory or easily controlled rate of setting.

Accordingly, the principal objects of the invention are to provide such an hydraulic cement slurry and to provide an improved method of cementing wells.

Broadly, the invention is an improved hydraulic-type cement composition consisting essentially of (1) an hydraulic cement, (2) a water-soluble reaction product formed by reacting $CS_2$ with a natural polymeric substance in an aqueous sodium hydroxide solution and (3) water, and the method of cementing a well penetrating a subterranean formation employing the improved slurried composition.

The water-soluble reaction product employed in the practice of the invention is either a dithiocarbonate or a dithiocarbamate. Dithiocarbonates are commonly referred to as xanthates. When a carbohydrate is a natural polymeric substance employed, e.g., a polysaccharide or starch, a xanthate is formed. When a protein is the natural polymeric substance employed, e.g., casein or soybean flour, a dithiocarbamate is formed. Either reaction may be referred to broadly as xanthation and will be so referred to herein. The xanthated natural polymeric substances employed must be sufficiently water-soluble to be readily dissolved or dispersed and remain so dispersed in aqueous cement slurries. Fluid loss to the formation of the slurries to which the xanthated substance is added in accordance with the invention is markedly reduced. The term water-soluble is used herein in the sense employed in the art of high polymer chemistry and means that the substance forms with water either an homogeneous substantially clear suspension or a true solution.

When a carbohydrate in a NaOH solution is used to prepare the additament employed in the practice of the invention, the reaction product resulting from treatment with $CS_2$ may be represented by the formula:

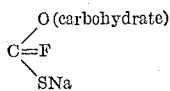

When a protein in an aqueous NaOH solution is used to prepare the additament employed in the practice of the invention, the reaction product formed by the treatment with $CS_2$ may be represented by the formula:

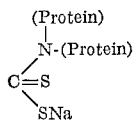

or

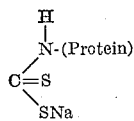

Many suitable natural polymeric substances useful in preparing the additament employed in the practice of the invention are mixtures of both proteins and carbohydrates with or without some fats. Among such substances are cottonseed meal, soybean flour, and milk solids. Sodium starch xanthate is most commonly used in the practice of the invention because of the availability and favorable economic position of starch; it will be largely used to illustrate the practice of the invention.

Methods of preparing sodium starch xanthate are well known. U.S. Patent 1,412,020 describes one of such methods. The procedure followed to prepare the sodium starch xanthate used in the practice of the invention is, generally, that set out in that patent.

In practicing the invention, the polymeric xanthate product made, as above described, may be admixed with the aqueous cement slurry but is preferably admixed with the water prior to admixture with the dry cement and the composition thus made pumped down a wellbore according to known well cementing techniques. A particularly good way of practicing the invention is to admix the polymeric xanthate with the water to be employed in the slurry and then force the aqueous solution and a suitable amount of dry cement, from a separate convenient supply, into a merging line which leads down the wellbore into the confined zone desired to be cemented, as, e.g., an annulus between the wellbore wall and a casing, having upper and lower limits defined by suitably positioned packers.

For the purpose of illustrating the invention, sodium starch xanthate was prepared as set out below:

200 grams of potato starch were added to 800 grams of water in a kitchen-type mixer provided with a motor-driven beater and mixed for 5 minutes on the No. 3 speed, of an increasing speed range graduated from 1 to 10 which is about 274 r.p.m. to make a dispersion. 150 grams of NaOH dissolved in 200 grams of water were then admixed with the starch dispersion, while stirring. Stirring was continued a sufficient time thereafter for the reaction to be substantially completed, which required about 0.5 hour.

A total of 227.1 grams of $CS_2$ were then admixed with the aqueous starch-NaOH reaction mixture by three additions of 57.7 grams each, at 0.5 hour intervals, and stirring continued for 1 hour after the last addition of $CS_2$. An orange colored viscous liquid having a specific gravity of 1.25 gm./cc. and containing about 40 percent sodium starch xanthate was thus prepared.

Other xanthated polymeric substances employed hereinafter were prepared similarly to the procedure above used in preparing the starch xanthate.

Various aqueous hydraulic cement slurries were prepared and tested to show the effectiveness of admixing therewith a $CS_2$-natural polymeric reaction product to reduce fluid loss of the cement slurries.

The slurries employed in the tests were made by first preparing a suitable aqueous suspension of the reaction product of starch, the aqueous NaOH solution, and the $CS_2$, as described above (except in the blank runs where other additaments were employed for purposes of comparison), admixing therewith additional water as desired for the cement slurry, and thereafter admixing with the aqueous xanthated polymer (or other additament employed in the blanks) Portland cement in an amount sufficient to produce a slurry containing 46 parts water to 100 parts dry cement by weight. Mixing of the additament and cement required about 1 minute on No. 3 speed as explained above. Cements employed are designated by the classification given them by the American Petroleum Institute in Recommended Practice for Testing Oil Well Cements and Additives, API RP 10B (January 1959).

The fluid loss of the cement slurries thus prepared was determined according to Section IV of API Recommended Practice for Standard Field Procedure for Testing Drilling Muds, API RP 29 (May 1950) or according to Section IV or API RP 10B cited above. The fluid loss test employed is indicated for each test. The fluid loss rates were based upon the milliliters lost in 30 minutes unless the rate was too fast to permit a 30 minute test wherein the loss for 1 minute was used.

Examples 1 to 11 were run on cement slurries to show the effect on fluid loss of admixing therewith the reaction product, formed by treating various natural polymers in aqueous NaOH with $CS_2$, hereafter referred to broadly as xanthated polymers, according to the practice of the invention. 500 grams of A.P.I. Class A Portland cement, 230 grams of water, and 10 grams of the aqueous xanthated polymer solution, containing the number of grams of the xanthate which are set out in each example of Table I, were used in each example.

Blanks A to H were run for comparison purposes. They employed the same amounts of cement and water as the examples but did not employ the xanthated sodium polymer prepared as required for use in the invention: Instead of the xanthated sodium polymer additament, Blank A employed cellulose only and Blank B employed potato starch only; Blank C employed NaOH and potato starch which was not treated with $CS_2$ to produce the xanthate; Blanks D, E, and F employed alkaline earth xanthates; Blanks G and H employed xanthates of alkali metals other than sodium. 10 grams of the cellulose, starch, starch and NaOH, or the aqueous metal xanthate solution other than sodium xanthate were employed in the blanks. However, only the amount of metal xanthate which was thought to be present in the 10 grams of solution are set out in Table I.

TABLE I

| Run Number | Grams of Reactants Employed in Preparing Additament | | | | Grams of active ingredient added | Fluid loss in milliliters | API fluid loss test employed |
|---|---|---|---|---|---|---|---|
| | Water | Metal hydroxide | Natural polymeric material | CS$_2$ | | | |
| Blank: | | | | | | | |
| A | None | None | 20, purified cellulose | None | 10.0 | >100 in 1 min | RP 29 |
| B | None | do | 4, potato starch* | None | 10.0 | 93 in 1 min | RP 10B |
| C | None | 2.5, NaOH | 3, potato starch* | None | 10.0 | 90 in 1 min | RP 10B |
| D | 800 | 100, Ca(OH)$_2$ | 200, potato starch | 120 | 4.7 | >100 in 1 min | RP 10B |
| E | 800 | 100, Mg(OH)$_2$ | do | 120 | 4.7 | do | RP 10B |
| F | 1,100 | 395, Ba(OH)$_2$** | do | 120 | 3.5 | 100 in 1 min | RP 10B |
| G | 800 | 100, LiOH | do | 120 | 4.3 | 79 in 30 min | RP 10B |
| H | 800 | 100, KOH | do | 120 | 4.5 | 35 in 1 min | RP 10B |
| Example: | | | | | | | |
| 1 | 82 | 18, NaOH | 20, purified cellulose | 50 | 4.0 | 10 in 30 min | RP 29 |
| 2 | 164 | 36, NaOH | 100, soluble starch | 50 | 7.4 | 25 in 30 min | RP 29 |
| 3 | 164 | 36, NaOH | 100, dextrin | 20 | 7.4 | 10 in 30 min | RP 29 |
| 4 | 164 | 36, NaOH | 100, soy bean flour | 30 | 7.4 | 29 in 30 min | RP 29 |
| 5 | 164 | 36, NaOH | 100, milk solids | 20 | 7.4 | 6 in 30 min | RP 29 |
| 6 | 164 | 36, NaOH | 100, cottonseed meal | 30 | 7.4 | 15 in 30 min | RP 29 |
| 7 | 164 | 36, NaOH | 100, tapioca flour | 30 | 7.4 | 7 in 30 min | RP 29 |
| 8 | 820 | 180, NaOH | 250, amylose | 100 | 5.6 | 15 in 30 min | RP 10B |
| 9 | 820 | 180, NaOH | 250, amylopectin | 100 | 5.5 | 9 in 30 min | RP 10B |
| 10 | 820 | 180, NaOH | 250, cornstarch | 100 | 5.9 | 13 in 30 min | RP 10B |
| 11 | 1,000 | 100, NaOH | 200, potato starch | 120 | 4.0 | 28 in 30 min | RP 10B |

*Only the amount of 3 or 4 grams could be added before excessive thickening set in.
**Added as Ba(OH)$_2$.8H$_2$O.

An examination of the results of Examples 1 to 11 of Table I shows that xanthated sodium salts of natural polymeric substances such as starches, sugars, cellulose, and such highly protein materials as soybean flour and cottonseed meal, when admixed with an aqueous hydraulic cement slurry in the amount of between 0.7 and about 1.5 parts of the xanthated composition per 100 parts by weight of dry cement in the slurry in accordance with the invention, caused a marked decrease in the fluid loss of the cement slurry. Blanks A and B show that either cellulose or starch employed without first converting it to the xanthate has but a small effect, if any, on the fluid loss of the slurry in contrast to that exhibited when the sodium xanthate thereof is made and used. Blank C shows that a mixture of starch and sodium hydroxide, when the mixture is not xanthated prior to being admixed with the cement, is not satisfactory as a fluid loss additament. Blanks D to H show that, although a natural polymeric xanthate prepared in the presence of an alkaline earth metal hydroxide or an alkali metal hydroxide other than sodium lowers the fluid loss of a cement slurry with which it is admixed, it is not generally satisfactory for the practice of the invention.

Examples 12 to 17, set out below, were run to show the effect of varying the amount of xanthated sodium polymer added to a cement slurry in the practice of the invention to lessen fluid loss of the slurry. Potato starch prepared as described hereinabove was employed in the preparation of the xanthated polymer used in these tests. Cement slurries were made by admixing 750 grams of API Class A cement with the weight of water set out in Table II. The sodium starch xanthate was employed as 40 to 50 percent aqueous solution in the examples. The composition thus prepared showed no objectionable thickening and was readily pumpable. Blank I which contained no additive was run for comparative purposes. The amount of sodium starch xanthate added in the examples is set out in Table II, together with the fluid loss of the thus treated slurry as determined according to API RP 10B, Section IV, "Filter-Loss Tests" and the compression test of the set cement according to the API RP 10B, Section V, "Strength Tests."

TABLE II

*Effect of Variations in Amount of Xanthated Polymer Added on Fluid Loss*

| Run No. | Grams of sodium xanthated polymer in a 40 to 50 percent aqueous solution | Parts by weight of xanthated polymer based on 100 parts dry cement | Grams of water in cement slurry | API RP Test Results | |
|---|---|---|---|---|---|
| | | | | Fluid loss in milliliters | Compressive strength in p.s.i. after 25 hours at 150° F. |
| Blank I | None | None | 345 | 80 in 22 seconds | 4,226. |
| Example: | | | | | |
| 12 | 2.5 | 0.33 | 342 | 94 in 3 minutes | (Not determined.) |
| 13 | 5.0 | 0.66 | 340 | 42 in 18 minutes | 4,234. |
| 14 | 7.5 | 1.00 | 335 | 23.6 in 30 minutes | 2,965. |
| 15 | 10.0 | 1.33 | 330 | 13.6 in 30 minutes | 3,246. |
| 16 | 12.5 | 1.66 | 325 | 8.8 in 30 minutes | 3,169. |
| 17 | 25.0 | 3.30 | 300 | 3.2 in 30 minutes | (Not determined.) |

An examination of Table II shows that sodium starch xanthate, which is typical of the xanthated natural substances which can be employed in the practice of the invention, effectively lessened the fluid loss of the cement slurry when admixed therewith in amounts between 0.33 and 3.3 parts per 100 parts by weight of dry cement. The table indicates that at least 0.66 part and preferably at least 1 part of the xanthated polymer should be employed and that greater amounts than 1.66 parts per 100 of the cement appear unnecessary. The aqueous slurries of the invention were satisfactorily fluid for cementing operations and set to a hard mass having adequate compression strength for use in well cementing.

Examples 18 and 21 set out below were run employing API Class E cement. This type of cement is one having slow or retarded setting characteristics and is well known. Descriptions of cements of this class are found in U.S. Patents 2,782,858, 2,771,953, and 2,580,565 as well as in API RP 10B. Aqueous cement slurries consisting of commercially available Class E cements, water, and sodium starch xanthate, in the amounts set out in Table III below, were run. The sodium starch xanthate was added as a 40 percent aqueous solution as in the above examples.

The weight of the xanthate contained in the solution used is set out in Table III.

TABLE III

*Effect of Xanthated Polymer on Fluid Loss Slurries of Various Cements*

| Run Number | Grams and name of retarded cement | Grams of water in slurry | Parts by weight of sodium starch xanthate based on 100 parts dry cement | Fluid loss in Ml. API RP 10B |
|---|---|---|---|---|
| Example: | | | | |
| 18 | 800 Trinity Inferno | 305 | 3.125 | 8.8 in 30 min. |
| 19 | 800 Unaflo | 305 | 3.125 | 10.2 in 30 min. |
| 20 | 800 Starcor | 305 | 3.125 | 15.2 in 30 min. |
| 21 | 800 Longhorn Oil Well Special | 305 | 3.125 | 12.8 in 30 min. |

An examination of the results set out in Table III shows that a marked reduction in fluid loss was effected by admixing the sodium starch xanthate with aqueous Type E slurries.

Although cement Classes A and E are most widely used in well cementing, the practice of the invention is applicable to slurries prepared from cement Classes B, C, D, and F.

Xanthates, after their preparation, undergo a slow decomposition process known as ripening. A discussion of xanthate ripening may be found in High Polymers Vol. 5, 2nd Edition, Interscience Publishers, New York, N.Y.

Further tests, therefore, were run to determine the effect of aging or ripening of sodium starch xanthate, prior to admixture with a slurry of a Class A cement, on fluid loss and thickening time of the slurry and on compression strength of the set cement. Sodium starch xanthate, prepared as in the tests above, was admixed, after varying period of storage at atmospheric or room temperature following its prepartion, with aqueous slurries of Class A cement in the following amounts: 1000 grams cement, 400 grams water, and 43 grams of sodium starch xanthate. The slurries containing the variously aged xanthate were tested for fluid loss according to the method of API RP 10B (Section IV). Thickening time was measured according to API RP 10B (Section VII) employing a high temperature-pressure apparatus known as the Stanolind pressure thickening time tester described in U.S. Patent 2,266,733. The Stanolind tester was operated at a temperature of 144° F. and a pressure of 500 p.s.i. The conditions were those of API Schedule 6 described in that patent which simulates conditions at a depth of 10,000 feet in a formation.

A cement slurry having a viscosity of over 100 poises is considered too thick for well cementing. The time required to reach 100 poises is taken as the thickening time. A 4 hour thickening period is considered ample for normal well-cementing operations. Compression strength tests were run according to API RP 10B (Section V).

Six cement slurries were successively made up as above stated, employing the stored or aging sodium starch xanthate, the first slurry being made after 1 day's aging and the others about every additional four days thereafter until it had aged 25 days.

Test results over this period showed the fluid loss to vary between 23.5 and 52 milliliters in 30 minutes, the thickening time to be longer than 4 hours, and the compression test on the set cement to be 853 p.s.i. after 1 day, and thereafter not less than 2497 p.s.i.

Tests on the sodium xanthated polymer after it had aged beyond 25 days showed the thickening time to be less than 4 hours. Tests after 94 days showed the thickening time to be 14 minutes.

It can therefore be concluded that the sodium xanthated polymer which has been stored up to about a month at atmospheric conditions is satisfactory to use in the practice of the invention but that which is stored for longer periods may cause difficulties due to the decreased thickening time.

The effect of ripening of xanthates during storage at atmospheric temperatures is accelerated at advanced temperatures, a relatively short period at any advanced temperature having a similar effect to a relatively long period at normal temperatures.

When xanthated polymeric substances are to be used within about 24 hours, high temperatures such as may be encountered in well-cementing operations are not a serious detriment. However, xanthated polymeric substances useful in the practice of the invention tend to lose their effectiveness as fluid loss preventives when added to hydraulic cement slurries when subjected to relatively high heat, e.g., that above 140° F. for a period of a day or more. Such loss of effectiveness can be fully prevented by the addition to the xanthated polymeric substance of an alkali metal salt of an hydroxy polycarboxylic acid, e.g., sodium citrate. Such salt renders the xanthated substance stable against objectionable thickening and preserves its character as a fluid loss preventive for use in cement slurries.

To ascertain the effect of admixing an alkali metal salt of an hydroxy polycarboxylic acid with a cement slurry containing a polymeric xanthate, sodium starch xanthate was freshly prepared and heated at 144° F. for 48 hours. Seven portions thereof were used to prepare aqueous cement slurries according to the procedure followed above to show the effect of aging the xanthate at atmospheric temperature. Varying amounts of sodium citrate (employed as $2Na_3C_6H_5 \cdot 11H_2O$) were added to six of the slurries then prepared and the fluid loss of the thus treated slurries determined according to Section IV of API RP 10B. The tests are designated Examples 22 to 27. No sodium citrate hydrate was added to one slurry which was run for comparative purposes This test is designated Blank J. The results of the blank and examples are set out in Table IV. The use of the sodium citrate was associated with no noticeable adverse effects on thickening, fluidity, or pumpability of the slurry or on the strength of the set cement.

TABLE IV

*Effect on Fluid Loss of Cement Slurry Containing Aged Xanthated Polymers by Adding Sodium Citrate Thereto*

| Run No. | Percent $2Na_3C_6H_5O_7 \cdot 11H_2O$, based on weight of xanthate present, admixed with cement slurry | Fluid loss in milliliters API RP 10B |
|---|---|---|
| Blank J | None | Complete loss of fluid in 15 seconds. |
| Example: | | |
| 22 | 3.2 | 33 in 30 minutes. |
| 23 | 6.4 | 21 in 30 minutes. |
| 24 | 9.6 | 22 in 30 minutes. |
| 25 | 12.8 | Do. |
| 26 | 16.0 | 30 in 30 minutes. |
| 27 | 19.2 | 20 in 30 minutes. |

Table IV shows that where the sodium xanthated polymeric additament is to be stored or otherwise subjected to a temperature as high as 144° F. for any appreciable time, whereby its fluid loss properties are impaired, the addition thereto of the alkali metal salt of an hydroxy polycarboxylic acid of the type illustrated by the sodium citrate employed, prior to prolonged storage at the advance temperatures, completely prevents loss of fluid loss properties of the xanthated polymeric substance.

The sodium citrate may be added to the xanthated polymer when freshly made, after standing either at advanced temperatures or at normal temperatures, or it may be added to the cement slurry containing the sodium polymeric xanthate to preserve or restore the fluid loss properties of the xanthated polymer. Between 3 and 20 percent by weight of sodium citrate hydrate, based on the weight of the xanthated polymer employed, may be added but between 6 and 12 percent appears to give best results. Expressed as the sodium citrate only, i.e., without the added weight of the water of hydration, the percent thereof should be between about 2 and 14 and preferably between about 4 and 8.5 percent.

A number of the examples of Table IV were repeated except that, instead of sodium citrate, each of the following substances were added to ascertain the effect, thereof, if any, on stabilizing the xanthated polymer against ripening: sodium sulfite, calcium acetate, sodium borate, sodium phosphate, and certain amino derivatives. No beneficial effect on retarding the ripening of the xanthated polymer could be detected.

To cement off a well according to the invention, the following procedure is illustrative of the preparation of 1000 gallons of slurry and positioning thereof in the zone to be cemented:

34.5 gallons (359 pounds) of xanthate of aqueous Idaho potato starch composition is prepared as described hereinabove. 582 gallons (4850 pounds) of water are placed in a 1000 gallons capacity rotating paddle mixer. The xanthate composition is added to the water and stirred therein for about 15 minutes. While continuing to stir, 113 sacks (10600 pounds) of an API Class A cement are then admixed with the xanthate solution in the mixer, the mixing continuing for an overall time of about 0.5 hour, or longer if desired. The slurry thus prepared has a density of about 15.6 pounds/gallon. If the zone to be cemented is the space about the foot of a casing, for example, a string of tubing is preferably run down the well to a point some distance above the zone to be cemented and a packer positioned in the annulus between the tubing and the casing. The slurry is then pumped down the tubing and into the space to be cemented according to conventional cementing practice until the space is filled. The well is then closed in for a period to allow the cement to set. The composition of the invention is easily pumped because it does not tend to thicken too fast. Because of its low fluid loss characteristic, it is easily positioned as desired and objectionable amounts do not seep out into the pores of the formation. The set cement is satisfactory for use in all known well cementing jobs.

A number of advantages stem from the practice of the invention. Among such advantages are the practically inexhaustable supply of the natural polymer for use in preparing the xanthate or thiocarbamate additament; the marked reduction in fluid loss of cement slurries in which a relatively small amount of the xanthate or thiocarbamate natural polymer is added; the ease and simplicity of preparing the slurry of the invention and method of cementing wells employing the slurry; and the absence of any concomitant bad effects either in the use of the cement slurries containing the additament, on the well equipment, or on the formation in which it is used.

Having described the invention, what is claimed and desired to be protected by Letters Patent is:

1. The method of cementing a zone in a well penetrating a porous formation, whereby water loss from an aqueous slurry to the formation is lessened, consisting of admixing by weight between 0.33 and 3.3 parts of a water-dispersible natural polymeric substance having a formula selected from the class consisting of

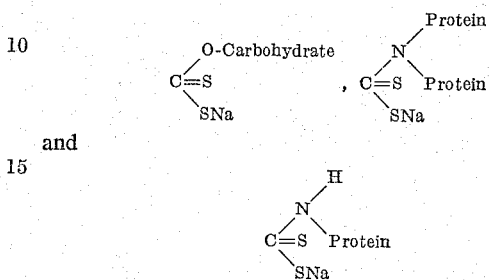

and $$C(=S)(SNa)(NH\text{-Protein})$$

per 100 parts of an hydraulic cement, selected from the class consisting of Portland cements and aluminous cements, and between 2 and 14%, based on the weight of said polymeric substance, of an alkali metal salt of an hydroxy polycarboxylic acid to preserve the water-loss preventive properties of said polymeric substance against degeneration by heat, and between 35 and 60 parts by weight of water to make a pumpable homogeneous slurry; injecting the slurrry thus made down the well and positioning it in the zone to be cemented; and allowing the cement so positioned to set to a hard unitary mass.

2. The method according to claim 1 wherein said alkali metal salt of an hydroxy polycarboxylic acid is sodium citrate.

References Cited in the file of this patent
UNITED STATES PATENTS

| | | |
|---|---|---|
| 1,412,020 | Stern | Apr. 4, 1922 |
| 1,854,703 | Lauchs | Apr. 19, 1932 |
| 1,950,060 | Osgood | Mar. 6, 1934 |
| 2,292,616 | Dailey | Aug. 11, 1942 |
| 2,300,325 | Van Leeuwen | Oct. 27, 1942 |
| 2,305,483 | Letters | Dec. 15, 1942 |
| 2,489,793 | Ludwig | Nov. 29, 1949 |
| 2,562,148 | Lea | July 24, 1951 |
| 2,668,098 | Alm | Feb. 2, 1954 |
| 2,672,424 | Avery | Mar. 16, 1954 |
| 2,674,321 | Cutforth | Apr. 6, 1954 |
| 2,723,232 | Scott | Nov. 8, 1955 |
| 2,884,334 | Meadows | Apr. 28, 1959 |

FOREIGN PATENTS

| | | |
|---|---|---|
| 129,033 | Great Britain | July 10, 1919 |

OTHER REFERENCES

Lea & Desch: "Chemistry of Cement & Concrete," pub. Edw. Arnold, Ltd., London (1956) (pages 13, 14, 464–466).